April 16, 1963  E. W. BALLENTINE  3,086,131
TRIBOELECTRIC GENERATOR

Filed Sept. 5, 1961  2 Sheets-Sheet 1

INVENTOR:
Earle W. Ballentine

Attorneys

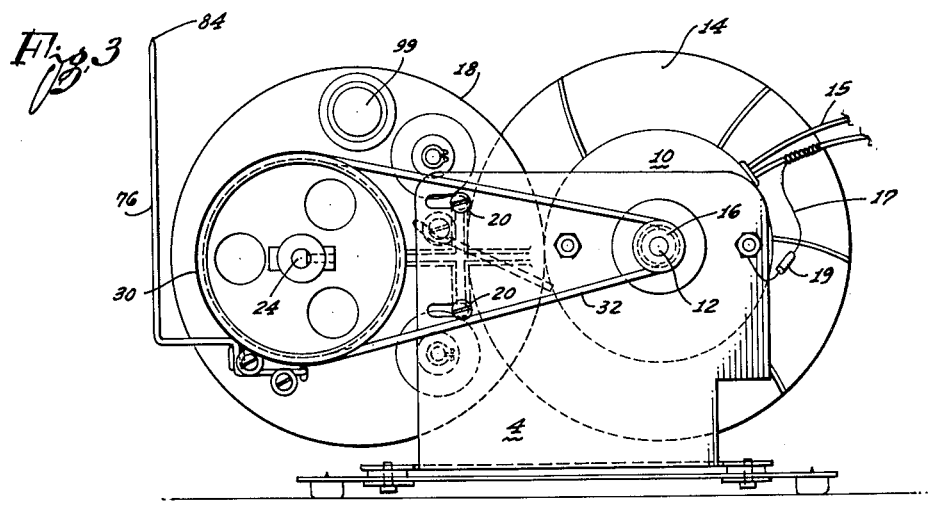
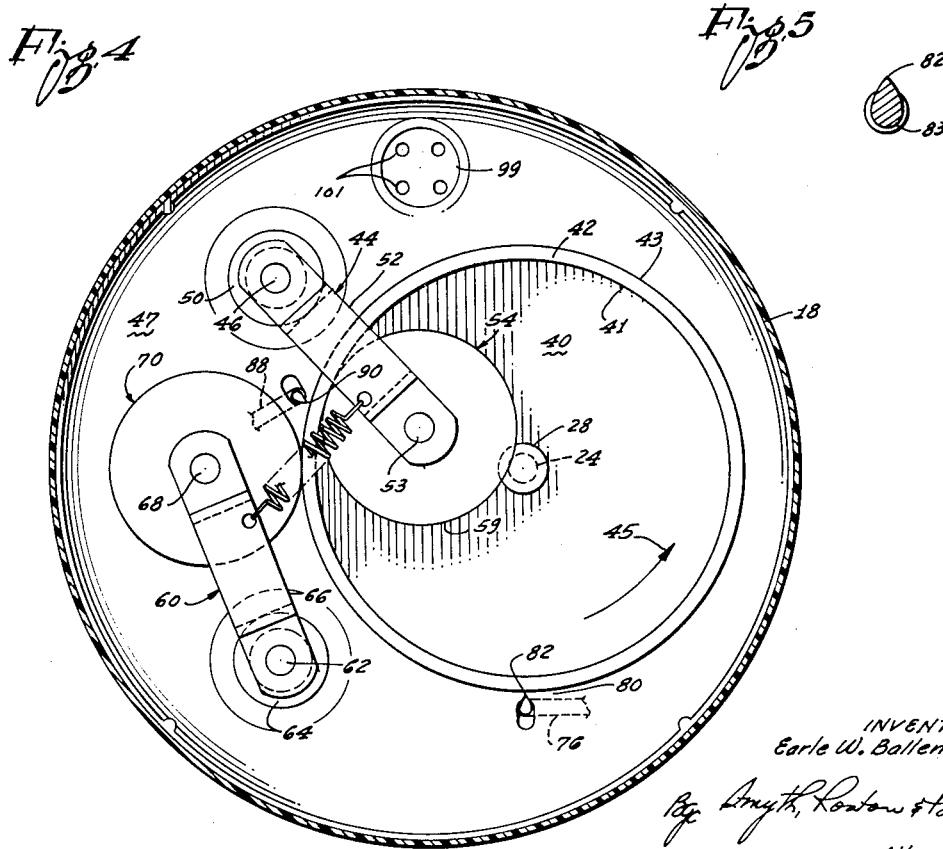

United States Patent Office 3,086,131
Patented Apr. 16, 1963

3,086,131
TRIBOELECTRIC GENERATOR
Earle W. Ballentine, 27 Packet Road,
Portuguese Bend, Calif.
Filed Sept. 5, 1961, Ser. No. 135,902
21 Claims. (Cl. 310—7)

The invention relates to a triboelectric generator and particularly to a device of that type capable of producing relatively high unipolar potentials.

In many fields, it is desirable to produce relatively high unipolar potentials, for example, on an order of 5,000 to 15,000 volts. Examples of such applications relate to the requirements of electrostatic filter arrangements or the recent development of ionizers designed for therapeutic treatment. In the usual prior art devices, the usual means of supplying such high potentials was the conventional mode of rectifying the output of a high voltage transformer. Employing such circuitry and equipment have proven to be relatively complex and expensive. In the present disclosure, the invention described employs a triboelectric generator having certain unique structural and design characteristics which render it capable of producing the desired potentials directly and with simplicity and efficiency.

To simplify understanding of the present invention, it is well to consider the earlier concepts involved in triboelectric theory and in the production of electrical potentials by triboelectric devices. Heretofore, triboelectricity has been classically defined as an electrical charge or potential resulting from or pertaining to friction. With this in mind, those skilled in the art will readily recall that the devices employed for the production of triboelectricity have achieved little, if any, commercial application. They have been primarily directed to classroom devices for illustrative purposes or in a few instances, arrangements designed for the intellectual exercise of persons engaged in research and development in this little applied field. Primary reasons for the lack of application in practical arrangements of these types of devices have related to their relatively low current output, excessive power input required for operation and a relatively short service life.

As a result of investigation in this field, I have discovered and developed a variation in the basic concept of triboelectricity, per se. For example, and as above noted, the traditional concept considered that friction of a relatively high degree was required between contacting surfaces to produce the electrostatic potential on the surfaces. Logically, this conclusion was the result of the fact that large contact areas employed in the producing of the rubbing or sliding action which generated in the electrical potential, incidentally thereto, produced considerable quantities of friction. It was this close association between the devices used to produce the electrostatic charges and the developing theory that has led to the classical definition of triboelectricity.

It is proposed that triboelectricity be considered, from a conceptual standpoint, as an effect produced by contact differential differences between insulating materials which results in the formation of relatively large residual charges on the contacting surfaces. To better understand this concept, it will be considered that insulating materials may be arranged, as they have in prior art teachings been arranged, in a scale or order referred to as the triboelectric series. A characteristic of this empirically arrived at series is that the insulating substances are arranged in an order wherein the materials higher on the series list generate a positive electrostatic charge when physical contact is made between that material and a material occupying a lower position in the series. As a concomitant, it will be understood that the material occupying the lower position in the electrostatic series will, upon contact action, develop a negative electrostatic charge on its surface. A further teaching of the electrostatic series is that, when materials are employed having a wide separation in the series scale, larger maximum surface charge densities are developed.

Returning to the suggested conceptual approach to electrostatic charge development, it will be readily apparent to those skilled in that art that friction, per se, between the contacting materials can be considerably and minimally reduced by employing rolling contact between the materials rather than sliding contact. It has been discovered that certain important advantages relating to service life and charge quality are produced as a result of this basic variation. For example, when insulating materials are surface engaged to produce electrostatic potentials, an intense electric field may exist between the surfaces. This field will produce an electrical stress in the surfaces in the direction of the field that is normal to the material surfaces. When the contact area over which the electrostatic field is produced has been the result of a rubbing or sliding action between the materials, a mechanical shearing stress will also be induced in the surfaces of the contacting materials. Thus, we have stress action in the molecular structure of the material surfaces which results from both the electrical stress and the shearing stress mechanically produced by the physical contact therebetween. In prior art devices, it has been found that upon a relatively short service use, the ability to develop electrostatic potentials in the contact materials rapidly diminishes. It is thought that very small particles of one material are caused to disassociate themselves from that material as a result of the combined electrical and mechanical stress mentioned above and deposit themselves in the form of dust on the surface of the other contacting material. For this reason, it will be apparent that after a relatively short operative life, effective area contact between one material and another is considerably reduced. This results in the reduction in ability to develop unipolar potentials in the contacting materials.

On the other hand, where the two insulating materials are physically engaged by the rolling action of one material against the other, the mechanical shearing stresses mentioned above are reduced to a very small value. The reduction in mechanical shearing stress substantially reduces particle disassociation of the surface of the contacting materials, thereby eliminating or clearly reducing the ability of one of the insulating materials to surface coat the other insulating material. As a result, the service life of the generator so designed is found to be considerably lengthened and will continue to generate relatively high surface charges over reasonable periods of time.

It will also be understood that when rolling contact is employed between two insulating materials, the surface charge densities tend to build up relatively slowly. For this and other reasons that will hereinafter appear, the desirable end of producing relatively high triboelectric charge densities in the contacting surfaces requires a broad intimate contact between the two triboelectric materials. For example, because of the relatively low conductivity of the insulating materials employed, the charges produced at the point or areas of contact therebetween tend to remain in the area of production and do not spread to contiguous uncontacted regions. Furthermore, the relaxation time, which merely is the time required for the charge density in any given area to fall to 37% of its original value, is known to be relatively long. These reasons further support the necessity of broad intimate contact between the engaging surfaces rather than just high spot association. To achieve this end and to provide a generator of maximum efficiency, it is desirable that one of the materials employed in triboelectric generation be extremely smooth with minimal voids or other irregularities. It has further been found desirable that the second material employed be fibrous, thus offering a certain amount of flexibility but nevertheless be of relatively high density per unit of surface area. As examples of materials meeting these requirements, we have for the smooth continuous material found that injection molded rigid polyvinyl chloride to be very satisfactory. For the fibrous material, a high density wool sheet felt has proven to be superior to most products.

With the above principles in mind and for a better understanding of the disclosed invention, attention is now directed to the associated drawings, and the following illustrative specification wherein:

FIGURE 3 is a rear elevational view of the structure of FIGURE 1;

FIGURE 4 is a fragmentary sectional view of the generator housing and taken along line 4—4 of FIGURE 2; and FIGURE 5 is a transverse sectional view of a typical electrode employed in the generator.

Figure 1:
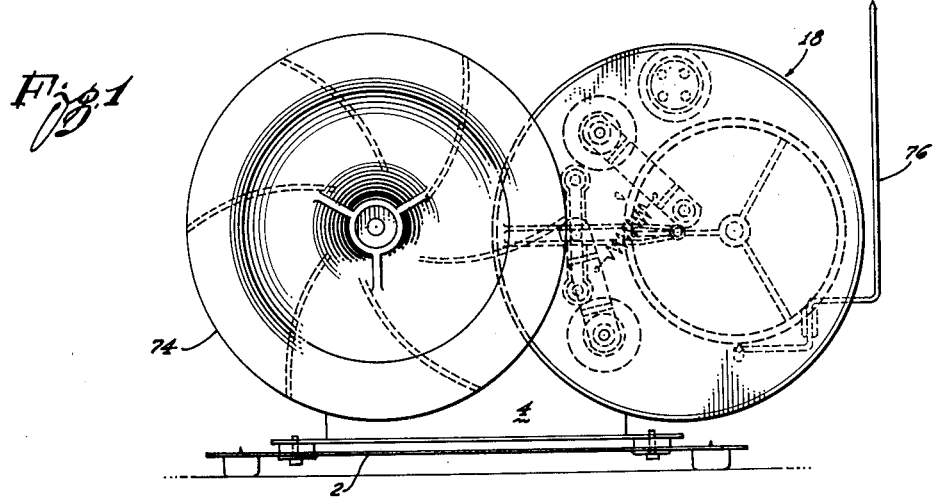
FIGURE 1 is a front elevational view of a preferred embodiment of triboelectric generator.
Figure 2:
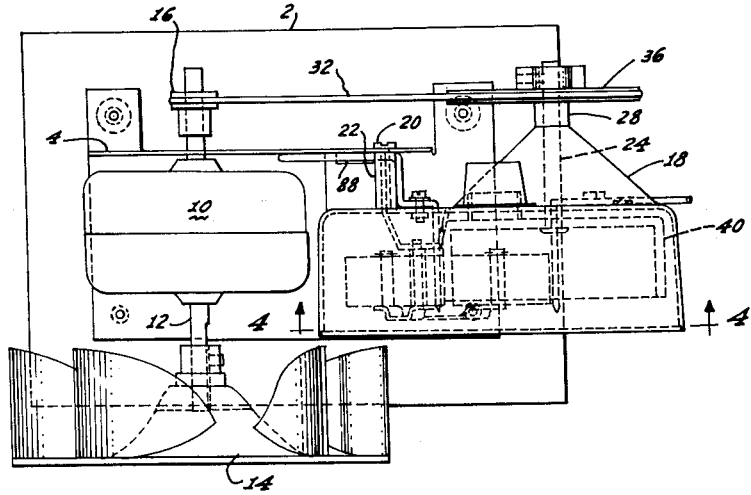
FIGURE 2 is a top plan view of the structure of FIGURE 1.

Describing the invention in detail and directing attention first to FIGURE 1, it will be understood that the generator unit may be provided with a base plate 2 of any suitable material, preferably stamped sheet metal. A mounting plate 4 can be secured to the base plate 2 in any suitable manner and preferably extends perpendicularly thereabove. Adjacent one side of the mounting plate 4, a suitable bracket arrangement 6 is provided conventionally mounting a small, fractional horsepower motor 10 which is provided with an armature shaft 12 extending from both sides of the motor. At one extension of the armature shaft 12 an appropriate cooling fan 14 is fixedly secured to the shaft. At the other extension of the shaft 12, an appropriate sheave 16 is fixedly mounted thereto in any conventional manner. It will be understood that the motor may be provided with appropriate electrical leads 15 for connection to an appropriate power source (not shown) whereby, upon power application, the shaft 12 of the motor 10 will be rotated. Further it will be noted that the plate 4 may be connected to ground through lead 17 and an appropriate series resistor 19 and connection to leads 15. Rotation of the shaft 12, of course, induces rotation of the connected fan whereby a source of moving air is provided for motor cooling. It will also be understood that the fan 14 here illustrated is of such capacity that it may be used as a moving air source in devices to which the generator may be applied such as an air ionizer in addition to its motor cooling function.

Directing attention to FIGURE 3, it will be seen that a triboelectric generator housing 18 is provided, said housing preferably being of cylindrical form and being made of an insulating non-metallic plastic material. The housing 18 may be secured to the mounting plate 4 in any conventional manner as, for example, by the bolts 20 which are received in appropriate threaded apertures in the lugs 22 which are, in turn, integral with the housing 18. A generator shaft 24 is journally mounted in the housing 18 via an appropriate bearing 28 and extends outwardly of the housing 18 whereat a second sheave 30 is secured thereto. A driving belt 32 provides power transfer from the first mentioned motor sheave 16 to the sheave 30. Thus, it will be understood that power from the motor is transmitted to and induces the rotation of the generator shaft 28.

Directing attention now to FIGURE 4, it will be seen that the shaft 28 extends into the housing 18 whereat it fixedly mounts a rotor element 40 which rotates with the shaft 28. In the preferred embodiment of the invention, the rotor 40 is shown as a cup-shaped cylinder preferably composed of polyvinyl chloride as mentioned above. The rotor 40 is provided with the annular cylindrical wall 42 which offers inner and outer surfaces 41 and 43 of the desired smooth continuous variety. While the rotor 40 is here shown in generally cup-shaped cylindrical form, it will be understood that other physical configurations may be employed within the scope of the disclosed invention such as, for example, a truncated cone formation or a simple flat disc arrangement.

Returning to FIGURE 4, it will be seen that a first movable shaft 44 is provided and is journally carried via shaft segment 46 by the rear wall 47 of the housing 18. Conventional journal or bearing means 50 may be employed for this purpose. The segment 46 extends outwardly from the wall of the housing 18 to a point whereat a generally downwardly extending segment 52 is provided to overlie the outer edge of the rotor wall 42. The segment 52 extends to the area internally of the wall 42, whereat another segment 53 is directed inwardly paralleling the wall 42 to journally mount a first contactor 54. The first contactor 54 in the preferred embodiment is again of generally cylindrical form. Also, it is preferably composed of a wool felt material having an annular high density surface which normally rollingly engages the inner surface 41 of the rotor wall 42. Again, it will be noted that the physical configuration of the contactor as well as the rotor here employed is a matter of the preferred embodiment only and that other physical configurations may be employed such as a generally conical or truncated conical form which will produce the desired rolling contact with the form of rotor employed. It will be understood, however, that in any of these suggested variations in physical arrangement, it is desirable that the resulting contact between the insulating materials have a uniform rolling characteristic throughout the line of contact and that the design be such that any sliding action which could result from a variation in linear speed as a result of a variation in the radial distance between particular points and points of rotation be avoided.

Noting again FIGURE 4, it will be seen that a second carrying arm 60 is again journally mounted to the rear wall 47 of the housing 18, said journalled mounting being accomplished by the segment 62 being conventionally received in a bearing arrangement 64. The segment 62 extends a generally perpendicular relation to the wall of the housing 18 and outwardly therefrom whereat segment 66 is formed to generally parallel the wall 47 and at a point adjacent the outer rim of the annular rotor wall 42. At this point, the arm is provided with the inwardly directed segment 68 generally paralleling rotor surface 43 whereat the segment may journally carry a second contactor 70. In physical construction, the second contactor is identical with the first contactor 54 and is in rolling engagement with the outer surface 43 of the rotor wall 42. In order to assure continuous contact between the rotor wall 42 and the respective annular surfaces of the first and second contactors 54 and 70, biasing means are employed to urge the contactors into such engagement. A preferred form of biasing means is coil spring 72 under tension and having its opposed ends connected to the segments 52 and 66 whereby the contactors 54 and 70 are brought into continuous pressure engagement with the rotor wall 42. It will be noted that as a feature of this construction that the rotor 40 and its journal shaft 24 are completely free of any bending movement due to contactor engagement therewith. This is true because the pressure exerted by contactors 54 and 70 balance and cancel each other out. Thus, any possibility of rotor deformation is avoided. Further, the efficiency and service life of the generator is improved.

To further understand the device here under consideration, it will be seen that a first electrode 76 is provided within the housing 18 in close but spaced physical relation to the outer rotor wall surface 43 as at 80. Electrode 76 is composed of conductive wire-like material and is characterized by a knife edge 82 directed toward the rotor wall 42, said edge blending with the smooth arcuate surface 83 of the electrode. The electrode 76 may be mounted in any convenient manner from the rear wall 47 of the housing 18 and extends outwardly from the housing for connection to load. In the illustrated embodiment the load is characterized by the relatively sharp point 84. For reasons that will later appear electrode 76 is preferably placed in said adjacency to the wall 42 at a physical point remote from the area of engagement between the wall 42 and the contactor 59.

A second electrode 88 may also be conventionally mounted from the rear wall 47 of the housing 18 and extend outwardly therefrom in parallel relation to the rotor wall 42. Typically, the second electrode 88 is also characterized by the knife edge 90 which also is directed toward the adjacent surface 43 of the wall 42. Preferably, the second electrode 88 is located adjacent said wall 42 and is in relatively close proximity to the second contactor 70, again for reasons which will hereafter appear. The second electrode 88 is also composed of a conductive material and extends through the rear wall of the housing 18 to ground connection with the metallic supporting plate 4.

Considering the operation of the disclosed generator, it will be understood, as above described, that the action of the motor 6 induces rotation of the rotor 40 in, e.g., the direction of arrow 45 and results in rotation of the contactor 56 by virtue of the intimate contact therebetween. As a result of this relative rotative contact, an electrostatic charge is generated on the internal surface 41 of the rotor wall 42 and on the external contactor surface 59. Characteristically, each of these electrostatic charges will be unipolar and of opposite polarity. For example, because of the material arrangement in the electrostatic series, the internal surface 41 of the rotor wall 42 will be provided with a negative charge, whereas the external surface 59 of the contactor 56 will be provided with a positive charge. It will also be understood that the charges produced on the respective surfaces are of a relatively high density and of the order of magnitude here under consideration. Continuous rotation and continuous contact to the respective surfaces results in a continued buildup of these electrostatic surface charges to a maximum level which is determined by the characteristics of the contact materials, i.e., their relative position in the electrostatic series the area of contact and the rate of rotation. As a result of these unipolar charges on the mentioned surfaces, an electrostatic field is built up in the surrounding space. It will be noted that the charge on the inner surface 41 of the wall 42 is carried by rotor rotation around to a point where the surface 41 is in close adjacency with the electrode 76. Those skilled in the art will understand that the potential at any point in an electrostatic field depends upon, both for polarity and intensity, the magnitude of the discrete charges setting up the field and the specific distance of each charge from the chosen point. In the area of the electrode 76, therefore, the potential intensity of the electrostatic field will be determined by the measurable distance of the electrode from each discrete charge on the inner surface 41 of the wall 42 and each discrete charge on the outer surface 59 of the contactor 54. Because of the greater area of surface 41 and its relative proximity to the electrode 76 as compared to the smaller area of the surface 59 and its relative increased distance from the electrode 76 the effective electrostatic field at the electrode 76 will be primarily determined by the charge on the surface 41 of the rotor 40. Recalling that the charge on the rotor surface 41 was negative, it will be understood, therefore, that the electrostatic field at the area of the electrode 76 induces a charge on the electrode 76 of a level less than the charge on the wall 42 and of opposite polarity. Typically, therefore, the charge induced on the electrode 76 will have a positive quality and a quantity less than the level of charge on the wall surface 41. As is usual in the case of induced charges on a conductor, the end on the conductor opposite the charged end is also charged as a result of electron flow within the conductor but again with a polarity opposite the polarity of the charged end. Thus, we see that the opposed end of the electrode 76, namely, at point 84, is provided with a negative charge.

At this point it is well to give brief consideration to the phenomenon known as corona transfer. The ability of a high density charge in a conductor to break down the resistance of the immediately adjacent gas, in this case air, and ionize same is a function of the level of the charge and the physical shape of the conductor. As the radius of the conductor increases a higher charge is required. In this case the diameter of the electrodes 76 and 88 are so selected that corona transfer will not occur at any undesired locale. At the pointed tip 84, however, and with the unipolar potential developed by the disclosed generator, corona transfer will occur with resulting high density ionization of the immediately surrounding air. Thus, an ionization load is provided at the point 84 of the electrode 76. It will be understood, however, that the disclosed generator is not intended to be limited to the example ionization load as it could well be used with other loads, as, for example, as a supply source for the unipolar potential required in an electrostatic filter. Other applications will also readily occur to those skilled in the art.

Returning now to the structure illustrated in FIGURE 4, and particularly the relationship between the electrode 76 and the wall surface 41, it will be recalled that a charge was induced in the electrode as a result of the above described electrostatic field action. Recalling that the charge of the electrode 76 was opposite to that of the adjacent wall surface 41, it will be understood that as a result of the knife edged formation of the electrode, as at 82, the phenomenon known as corona transfer here also occurs. As a result of this transfer, a positive electrostatic charge is deposited on the passing outer wall surface 43 and is carried along by the continuous angular movement of the rotor 40. Thus, in the length of the rotor wall 42 between the electrode 76 and the electrode 88, we have a continuous negative charge on wall surface 41 and a positive charge on a portion of the outer wall surface 43. If this multiple charge situation were allowed to continue, the over-all effect would be to tend to reduce the induced charge in the electrode 76 and reduced generator efficiency. This results from the fact that the positive charge on wall surface 43 complements the positive charge on contactor surface 59, which, as above described, reduces the negative potential level of the field at the electrode 76 with the consequent diminishing of the induced charge at the electrode.

In order to improve the efficiency of the generator, consideration now will be given to the secondary electrode 88. For purposes of clarity the secondary electrodes 88 will sometimes be referred to as the neutralizing electrode. The field potential in the area of the neutralizing electrode 88 will be understood as above described to be the effective sum of the negative charge on the surface 41, the positive charge on the surface 59 and the positive charge on the partial surface 43. The charge induced in the neutralizing electrode 88 is negative in polarity but is less than the initial charge flowing from the electrode 76. This will be apparent when it is considered that the potential due to the charge on the surface 43 can never be as great as the charge on the surface 41 which initially produced it and it is further diminished by the fact that it is disposed over only a portion of the surface 43. Additionally, the potential due to the charge on contactor surface 59 is likewise less that the charge on the surface 41 because of its small area and greater distance from the electrode 88.

Thus, the corona transfer charge flowing from the knife edge 90 of the electrode 88 to the surface 43 will be negative and less than the flow of charge to said surface 43 from the edge 82 of electrode 76. The result is that the flow of charge from the electrode 88 only partially neutralizes the positive charge deposited on the surface 43 by the electrode 76.

In order to correct potential deficiency at the electrode 88 it is desirable to introduce an additional charge distribution of the same polarity as the deposited charge on surface 43 by the electrode 76. One mode of accomplishing this end is providing a booster contactor 70 in rolling engagement with the outer surface 43 of the wall 42. As a result of triboelectric contact between the booster contactor 70 and outer surface 43, a positive charge is built up in the surface 79 of the booster contactor. This latter charge is the combined result of triboelectric contact with the rotor surface 43 as well as the effect of the residual corona induced charge on said surface 43. Thus, the potential at the electrode 88 is increased and a higher positive charge is induced therein. Corona transfer at the edge 90 of the electrode increases and the neutralizing effect on the surface 43 increases. This combined with the triboelectric effect on the surface 43 by virtue of contact with contactor 70 also tend to build up a negative charge on surface 43 after passing the electrode 88. In this manner the potential at the electrode 76 is increased resulting in a higher induced charge and increased generating efficiency.

It will be clearly understood that in the illustrative embodiment just described, the arrangement is not limited to the particular quality potentials referred to as it will be apparent to those skilled in the art, that by controlled variation of material in the triboelectric series, it is possible to control the unipolar quality of the dominating electrostatic field produced and thereby predetermine the production of either a positive or negative unipolar potential.

It will also be understood that the housing 18 is preferably sealed as completely as possible to prevent the ingress of dust, water vapor, or other foreign material. The accumulation of dust on the triboelectric surfaces has a tendency to decrease the over-all efficiency of the device by interfering with triboelectric generation. Further, it is desirable to maintain the volume in which triboelectric generation takes place as dry as possible and, for this reason, a moisture absorbing chamber 99 is carried within the housing 78 and in atmospheric communication therein as at 101, said chamber having disposed therein a suitable deliquescent compound such as active alumina or the like to act as an absorbing agent for any water vapor that may accidentally find entrance within the housing.

The invention as illustrated is by way of illustration and not limitation and may be subject to various modifications without departing from the spirit thereof or the scope of the appended claims.

I claim:

1. In a triboelectric generator, a first member having a first surface composed of a first insulating material, a second member having a second surface composed of a second insulating material, said second material having different physical characteristics than said first material, means to bias said surfaces into engagement with each other, means to move both of said members relative to each other while maintaining said surface engagement whereby electric charges are generated on the surfaces of said members in the area of said surface engagement, said surface charges being carried through space by the movement of said members, and fixed electrode means adjacent the surface of one of said members and in spaced relation thereto to receive an electric charge as said surfaces move in relation to the electrode means.

2. In a triboelectric generator according to claim 1, wherein said surface on said first member is smooth and even when seen in edge view, said surface on said second member being fibrous and resilient.

3. In a triboelectric generator according to claim 2, wherein said surfaces rollingly engage each other.

4. In a triboelectric generator according to claim 3, wherein said electrode comprises at least one relatively sharp edge, said edge being directed toward said adjacent surface.

5. In a triboelectric generator according to claim 4, wherein said electrode means is located remotely from the area of said surface engagement.

6. In a triboelectric generator according to claim 5, and including second electrode means closely adjacent the surface of one of said members and in spaced relation thereto, said second electrode means being located remotely from said first electrode means and in relatively close adjacency to said area of surface engagement.

7. In a triboelectric generator according to claim 6 wherein said second electrode means comprises at least one relatively sharp edge, said edge being directed toward said adjacent surface.

8. In a triboelectric generator according to claim 7, and including a third member having a third surface composed of a third insulating material, said surface being biased into engagement with one of said first mentioned surfaces for movable engagement therewith.

9. In a triboelectric generator according to claim 8, wherein said surface on the third member is fibrous and resilient and rollingly engages said first surface.

10. In a triboelectric generator according to claim 9, wherein said third surface engages said first surface in close adjacency to said first mentioned area of surface engagement.

11. In a triboelectric generator, an insulating rotor member journally mounted for rotation, an insulating contactor member journally mounted for rotation, means biasing said members into flexible engagement, power means to induce rotation of said members and rolling contact therebetween whereby electrostatic charges are generated on said members, first electrode means operative to receive a charge from said generated charges and make same available to a load, said electrode means including an element of small radius in close juxtaposition with one of said members.

12. In a triboelectric generator according to claim 11, and including second electrode means having a segment of relatively small radius in close juxtaposition with one of said members and in spaced relation to said first electrode means.

13. In a triboelectric generator according to claim 12, and including generating means to develop an additional electrostatic charge in relatively close juxtaposition with said second electrode means.

14. In a triboelectric generator, a rotatable rotor having a continuous insulating wall, a curvilinear rotatable contactor flexibly engaging one surface of the wall, means to rotate the wall and accommodate an area of rolling engagement between the contactor and wall whereby a triboelectric charge is generated on the one surface of the wall and on said contactor, the charge on the one surface being of opposite polarity than the charge on the contactor, a first load connected electrode, said electrode being fixedly mounted in closely spaced relation to said wall and generally remote from said area of rolling engagement whereby an electrical charge is induced in said electrode, means on the electrode accommodating corona transfer of charge from the electrode to another surface of said wall, and means to neutralize the charge transferred to said other surface.

15. In a triboelectric generator according to claim 14, wherein said last mentioned means includes a second circuit connected electrode fixedly mounted in closely spaced relation to said other surface and closely adjacent said area of rolling engagement, and an annular booster contactor flexibly engaging said other surface of said wall in an area adjacent said second electrode, said second electrode having means to accommodate corona transfer of charge to said other surface.

16. In a triboelectric generator according to claim 15, wherein said wall is cylindrical in form, said first mentioned contactor engaging the inner surface of said wall.

17. In a triboelectric generator according to claim 16, wherein said first electrode is located adjacent the other surface of said wall and said second electrode is located adjacent the other surface of said wall, said corona transfer means on both electrodes comprising knife edges directed toward said wall.

18. In a triboelectric generator according to claim 17, and including spring means operatively interconnecting the first mentioned contactor and booster contactor to flexibly bias both of said contactors into engagement with said wall.

19. In a triboelectric generator, an enclosed housing, a rotatable cylindrical wall disposed within the housing, said wall being made of insulating material, a first contactor journally carried on a pivotally mounted arm within the housing and in area resilient rolling engagement with an inner surface of said wall, a first load connected electrode having a knife edge directed toward and in close adjacency with an outer surface of said wall, said first electrode being in arcuate spaced relation from said area of rolling engagement, a second circuit connected electrode having a knife edge directed toward and in close adjacency with said other surface, said second electrode being in arcuate spaced relation to said first electrode, and a second contactor journally carried on a second pivotally mounted arm and in area resilient rolling engagement with said outer surface.

20. In a triboelectric generator according to claim 19, and including a tensioned coiled spring having opposed ends connected to said arms whereby said contactors engage said wall with equal pressure.

21. In a triboelectric generator according to claim 20, and including a chamber in said housing and in atmospheric communication therewith, said chamber having a deliquescent material disposed therein.

References Cited in the file of this patent
UNITED STATES PATENTS
2,641,025    Busby ------------------ June 9, 1953